Jan. 31, 1956  H. D. ADLER  2,733,429
MECHANICAL INDICATOR AND SIGNAL UNIT
Filed Oct. 29, 1953  3 Sheets-Sheet 1

INVENTOR.
HAROLD D. ADLER
BY Jerome P. Bloom
Wade Koontz AND
ATTORNEYS

INVENTOR.
HAROLD D. ADLER

United States Patent Office 2,733,429
Patented Jan. 31, 1956

2,733,429

MECHANICAL INDICATOR AND SIGNAL UNIT

Harold D. Adler, Waltham, Mass., assignor to the United States of America as represented by the Secretary of the Air Force Application October 29, 1953, Serial No. 389,184

7 Claims. (Cl. 340—345)

This invention relates to an improved mechanical indicator and signal unit capable of receiving an input through a rotating shaft whether clockwise or counterclockwise and reproducing said input for indication or control functions in a direct positive fashion and including means whereby the output may be limited to a predetermined range of input.

One form of preferred application of the subject invention is its incorporation as a deviation indicator for use in a straight line indicator in an aircraft whereby a deviation from a flight path in a clockwise or counterclockwise direction within a predetermined range may be readily indicated thereby and an appropriate signal transmitted. The device incorporates a dual counter system which will positively register the input whether positive or negative in positive fashion and accordingly provides an indication of distance off course whether to the right or left thereof at all times within a desired range while the signal output is limited in nature to a predetermined area when utilized in the deviation indicator. The subject invention will transmit any deviation signal which can be transmitted through a rotating shaft and incorporates a direct drive between the input and output shaft for a portion of the revolution of the input shaft providing a control signal within the limited range defined thereby and includes a coupling and uncoupling means so that the input shaft can be rotated any number of desired revolutions beyond the direct drive region while the output shaft is locked in position and the structure of the invention further functions as a memory device so that if the input shaft is rotated back to a direct drive region the same number of revolutions and fractions thereof it was rotated away, the output shaft will pick up at exactly the same point where it had been disengaged to transmit control and indicator signals within the predetermined range.

An object of this invention is to provide a highly accurate control and indicator signal transmitting unit.

A further object of this invention is to provide a novel signal transmitting unit which continually records the input in a positive fashion whether positive or negative.

An additional object of the invention is to provide an improved signal transmitting unit which will provide an output signal only within a predetermined range of input while continuously registering the input.

Another object of the invention is to provide a signal transmitting device which functions as a memory device to be operable only within a predetermined range.

Another object of the invention is to provide a novel clutching arrangement to control the output in a signal transmitting unit.

Other objects and advantages of the invention will be readily apparent to those skilled in the art from the following description taken in conjunction with the accompanying drawings wherein.

Figure 1:
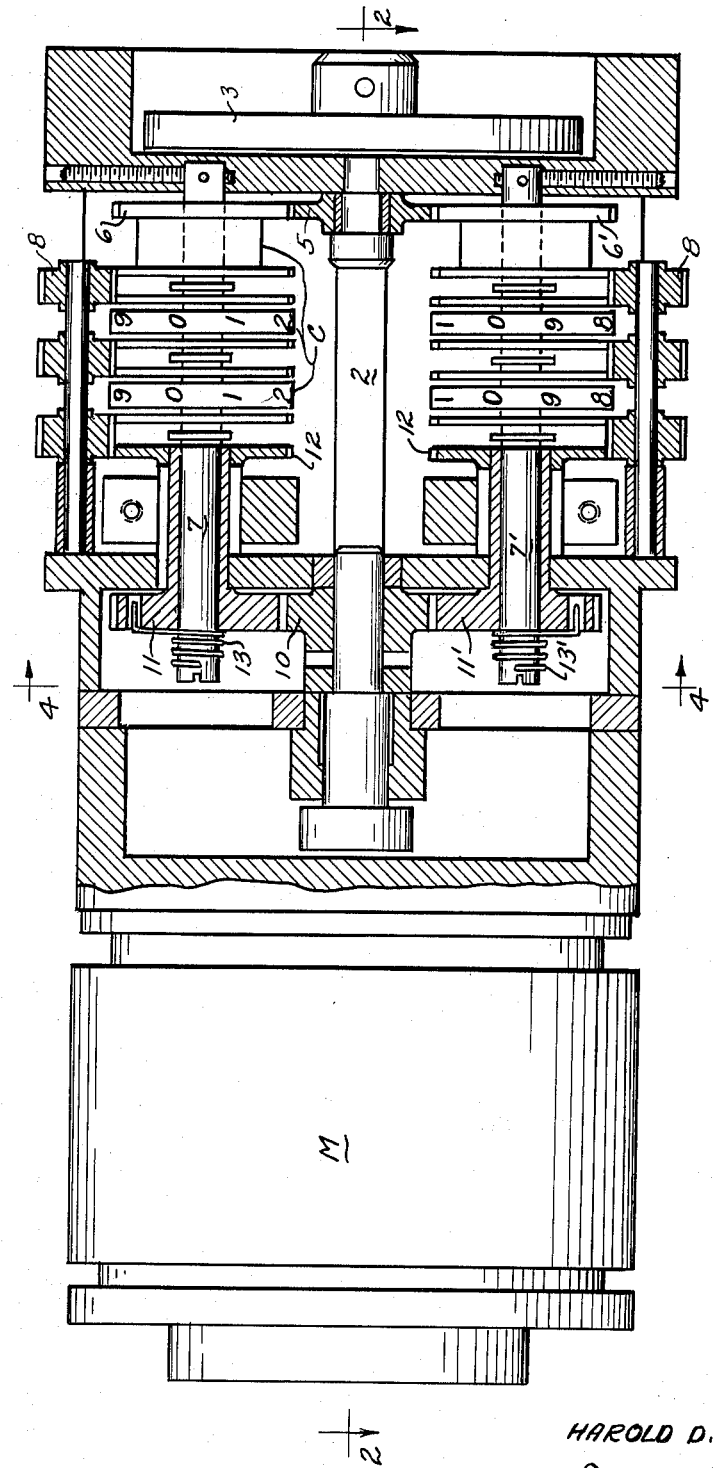
Fig. 1 is a partial sectional view of the novel signal transmitting unit.
Figure 2:
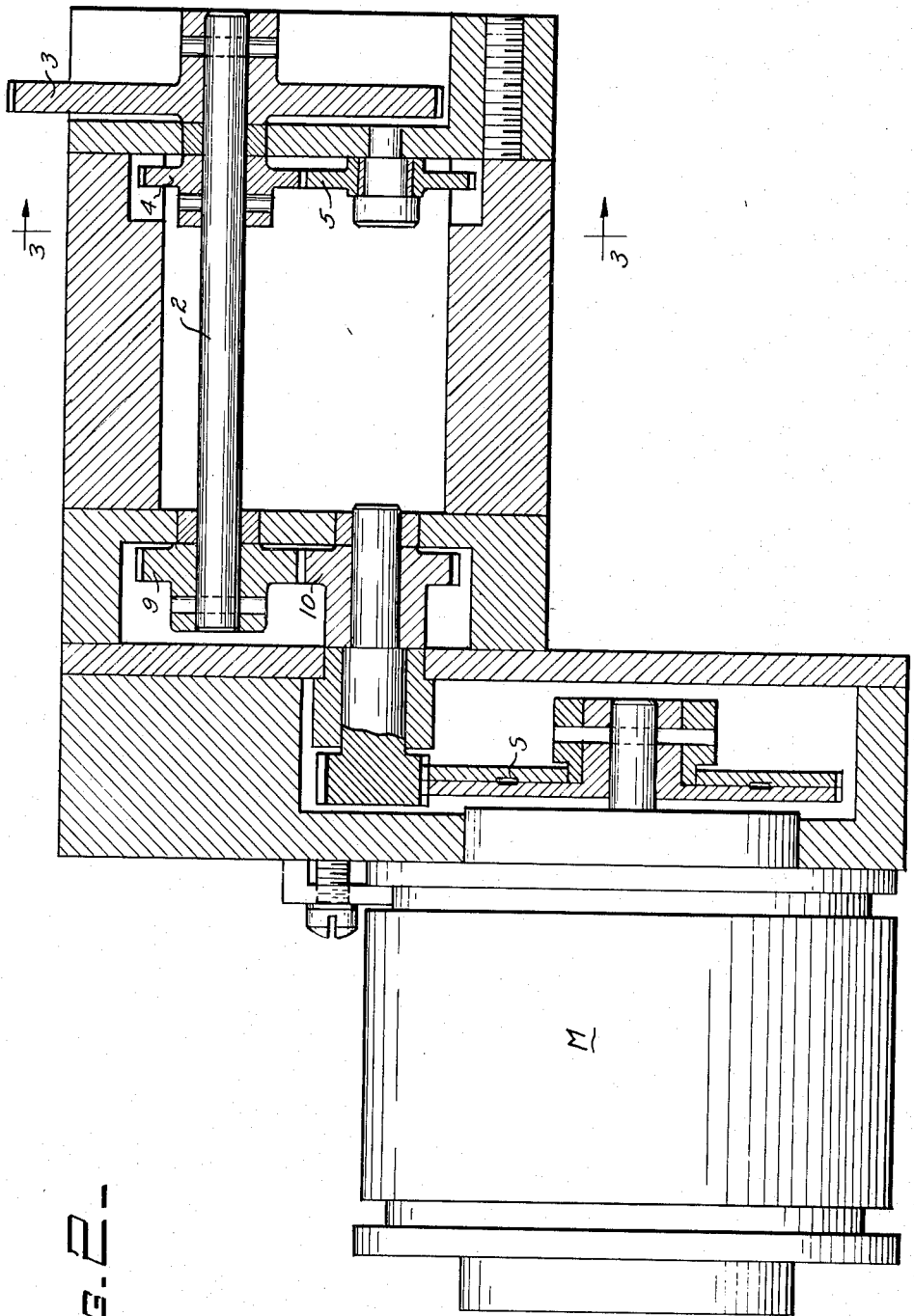
Fig. 2 is a view taken on line 2—2 of Fig. 1.
Figure 3:
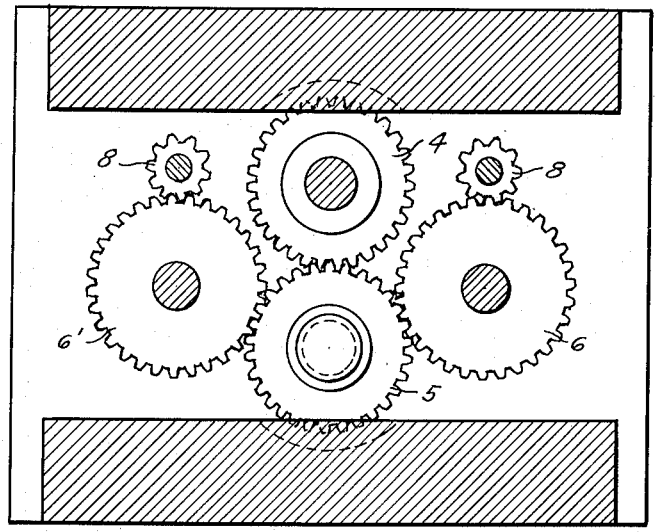
Fig. 3 is a view taken on line 3—3 of Fig. 2.
Figure 4:
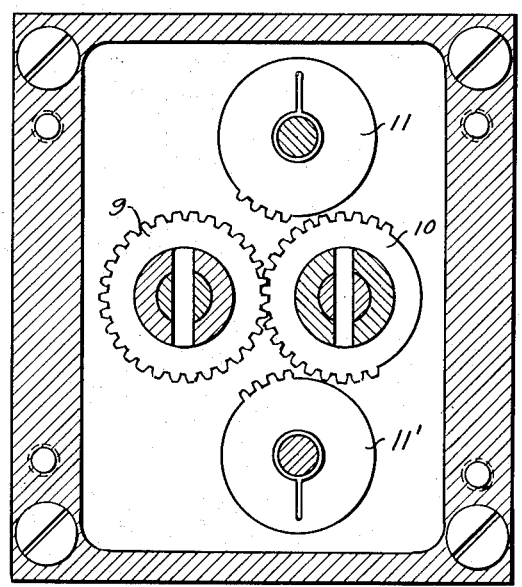
Fig. 4 is a view taken on line 4—4 of Fig. 1.

The subject invention structure comprises a housing 1 having a gear driven input shaft 2 bearing therein and extending longitudinally thereof with an input gear 3 fixed to the input end in a recess in the housing end wall. Immediately within the housing on shaft 2 is an input transmitting gear 4 in geared relation to a gear 5 driving two counter gears 6 and 6', one controlling counter mechanism to register input in a positive or clockwise direction and the other to register input in a counterclockwise or negative direction. In the application presented three digit counters are used so that three counter drums C are rotatably mounted in spaced relation on parallel fixed shafts 7 and 7'. Each counter drum has a driven and a stepping gear connected on either side thereof, the stepping gear merely employing four teeth in the embodiment shown for use in a stepping function. Hub members 8 having pinions thereon interrelate the successive counter drums in the usual fashion. In this way the second counter drum is rotated only one tenth of a revolution for every revolution of the first counter drum and there is a similar relationship between the second and third counter drums.

On the output end of shaft 2 is fixed an input transmitting gear 9 which directly transmits the input as does the gear 4. This gear 9 is drivingly related to an output gear 10 which has gear teeth extending from its periphery for only about 270° of its circumference. A normal zero position of the output gear 10 with input gear 9 is so arranged that the output gear 10 will transmit only through 135° in either direction. Gear clutch members 11 and 11' having only four teeth extending therefrom are mounted on the output ends of shafts 7 and 7' normally out of mesh with the output gear 10 within the limited driving range between the input and the output gear. Spring members 13 and 13' respectively are connected to the shaft members 7 and 7' and clutch members 11 and 11' providing backlash control. The stepping gears operatively related to the third counter unit on the shafts 7 and 7' are each associated through stepping pinion or hub member 8 with a control gear 12 and 12' respectively mounted on the inner ends of the extended hub portions of the clutching gears 11 and 11' to operate such clutching gears upon reaching the numerical range of the respective counter units which is made to correspond to the predetermined range of output. Upon disengagement of gears 9 and 10 depending on the direction of rotation of the input, the counter output gear 12 or 12' will engage the output gear 10, positively moving and locking it out of engagement with the input transmitting gear and preventing it from floating until a complete reversing of direction is sufficient to bring the input signal as recorded by the counter units back within the counter range of output at which time the input transmitting shaft will take over again as the gear 12 or 12' passes back through to the range prescribed to rotate gear into reengagement with gear 9.

In the practical embodiment shown a gearing arrangement is such and the counter sections calibrated so that the indicator portions of the counter sections will read 999 for just short of 135° of rotation of the input gear 9 in either direction so that on movement from 999 to 000 there is a tripping action on the gear 12 involved to disengage the input transmitting gear 9 from the output gear 10 on engagement of output clutch gear 11 or 11' with such output gear 10.

The output gear 10 in the practical embodiment shown transmits through split gears S to a microsyn M whereby a signal is transmitted.

Thus on input to the device a direct drive is accomplished to the output gear to give an output which is an exact reproduction of the input for the predetermined range which is defined by the numerical range of the counter units.

The output gear being mutilated and effective to promote a signal through only 135° rotation in either direction has its output limited to an effective range whereas the gears 11 and 11' respectively on the counter assemblies function to retain the output gear in locked engagement outside the predetermined range while the input shaft 2 and gear 9 continue rotating. When for example the device is used in aircraft to determine deviation from line of flight and the craft returns to within a predetermined range from the line of flight, the precise amount it departed, the unit functions as a memory device as it trips the counter unit through 000 sending a signal through the clutch gear and causing the tripping of the clutch gears for reengagement of the input and output gears directly thus signals again the return of the craft to within the predetermined output range.

The invention accordingly provides a positive accurate signal transmitter device arranged in an improved manner so as to function as a signal transmitter only within a predetermined range while receiving and recording continuously.

While a specific embodiment and application of the invention has been described herein, many modifications thereof as well as applications will be readily apparent to those versed in the art. The scope of the invention is intended to be limited only by the following claims.

What is claimed is:

1. A memory device comprising an input signal receiving means operably associated with an input shaft, spaced input transmitting gears on said shaft, an input recording assembly geared to one of said input transmitting gears continuously responsive to the transmission of an input signal, an output means associated in geared relation to another of said input transmitting gears within a predetermined range of input, mutilated gear means operatively associated with said input registering assembly responsive to an input signal extending said predetermined range to disengage said output means from said another of said input transmitting gears and similarly responsive to an input signal indicating a return to said predetermined range to cause reengagement of said output means with said another input transmitting gear whereby an output signal will be given only within a predetermined range of input.

2. A memory device comprising an input shaft having an input receiving means operably associated therewith, input transmitting gears arranged on said input shaft in spaced relation, input registering means operatively connected to one of said input transmitting gears to continuously register in a positive manner whether the input is positive or negative, an output means geared to another of said input transmitting gears within a predetermined range of input and clutch means connected with said input registering means operable on the exceeding of the predetermined input to disengage the output means from the input transmitting means.

3. In combination, input means including an input shaft driven in either of opposite directions, signal transmitting means to function for a limited input range and including a driven element, a drive element in the input means to releasably actuate the driven element, and means to control release and re-engagement of the driven and drive elements including a counter structure with a plurality of denominational order elements and associated carry devices, means in the input means for operating the counter, by way of its first order element, in ascending direction upon rotation of the input shaft in one direction and for operating the counter in descending direction upon reverse operation of the input shaft, and a member operated by one of said carry devices for releasing the driven and drive elements from each other upon ascending operation of the counter structure from a neutral position to an extent corresponding to the limited input range and for re-engaging the elements with each other upon operation of the counter structure in descending direction back to its neutral position.

4. The invention according to claim 3, said member effecting release of the driven and drive elements from from each other by shifting the driven element to an idling position and positively detaining it in idling position.

5. The invention according to claim 4, the drive element comprising a gear, the driven element comprising a mutilated gear passing out of mesh with the drive gear as the counter surface is performing a final increment of ascending operation to the extent corresponding to said limited input range, and said member comprising a partially toothed gear rotated by said one of the carry devices during said final increment for meshing with the mutilated driven gear and positively turning it in a direction to complete demeshing thereof from the drive gear.

6. The invention according to claim 3, there being two of such counter structures, one to register input for a positive direction of rotation of the shaft and the other to register input for a negative direction of rotation of the shaft, and the positive direction input counter controlling through a carry device and associated member release of the drive and driven elements for each other upon the shaft turning from a neutral position in the positive direction to an extent corresponding to the limited input range, while the negative direction input counter serves similarly through a carry device and associated member to effect said release upon the shaft turning in the negative direction to said extent from the neutral position of the shaft.

7. Apparatus to manifest amounts of deviation from a line of travel, comprising an input shaft rotating in one direction from a zero deviation position in accordance with amount of deviation in a positive direction from the line of travel and rotating in the reverse direction according to the amount of opposite, relatively negative deviation, signal control means to control signal manifestation of limited amounts of deviation in either direction, said signal control means including a driven device, a drive device operated by the input shaft for releasably actuating the driven device, and provisions to control release of said devices from each other including a pair of counter structures, one driven by said shaft to register amounts of positive direction deviation and the other also driven by said shaft but to register amounts of negative direction deviation, means operated by the positive deviation registering structure upon registering a limited amount of deviation in the positive direction to release the driven device from the drive device and similar means operated by the negative deviation registering structure upon registering a limited amount of deviation in the negative direction for releasing the driven and drive devices from each other.

References Cited in the file of this patent

UNITED STATES PATENTS 2,441,233    Beers _____ May 11, 1948